Figure 1:
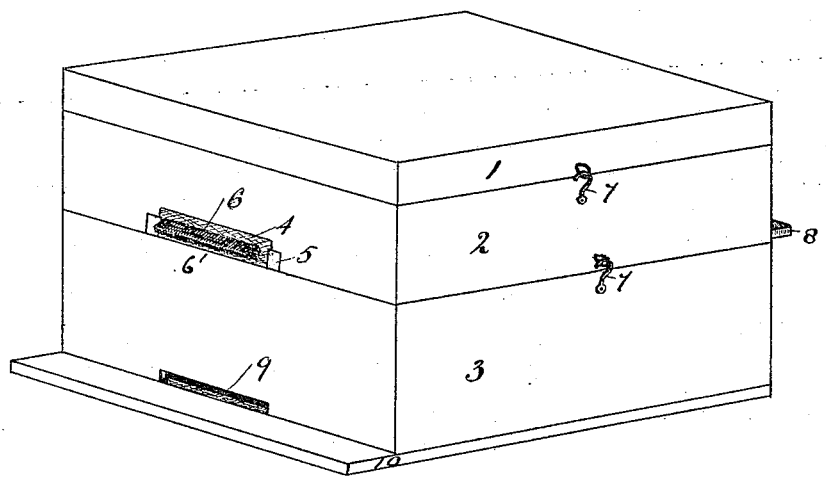

(No Model.)

A. J. PENNOCK.
BEE HIVE.

No. 442,687. Patented Dec. 16, 1890.

WITNESSES:

INVENTOR
Andrew J. Pennock
BY
A. J. O'Brien
ATTORNEY

UNITED STATES PATENT OFFICE.

ANDREW J. PENNOCK, OF LONGMONT, COLORADO.

BEE-HIVE.

SPECIFICATION forming part of Letters Patent No. 442,687, dated December 16, 1890.

Application filed April 15, 1890. Serial No. 348,065. (No model.)

*To all whom it may concern:*

Be it known that I, ANDREW J. PENNOCK, a citizen of the United States, residing at Longmont, in the county of Boulder and State of Colorado, have invented certain new and useful Improvements in Bee-Hives; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in bee-hives; and the objects are to provide a hive having a storage-chamber for the surplus honey so separated from the main portion of the hive or breeding-chamber that the honey can be conveniently and easily removed therefrom without resorting to the use of smoke, chloroform, or other anæsthetics to stupefy the bees, and without disturbing them in any manner whatever.

Among the important objects held in view in the manifold attempted improvements in bee-hives has been that of so separating the compartment or chamber containing the surplus or spare honey from the breeding portion of the hive that there should be no difficulty in removing such stored honey therefrom when such removal should be desired.

It is well known that in removing the honey from the ordinary hive careful protection is necessary to avoid being stung, unless the bees are first stupefied by some anæsthetic, and in resorting to these extreme measures great care must be taken to avoid destroying the life of the bees.

My improved device is believed to overcome the difficulties heretofore mentioned, its mechanism being at the same time simple in construction, economical in cost, easily operated, effective, reliable, and durable in use.

To these ends my invention consists of the features, arrangements, and combinations hereinafter described and claimed.

In the drawings is illustrated an embodiment of my invention, in which drawings—

Figure 2:
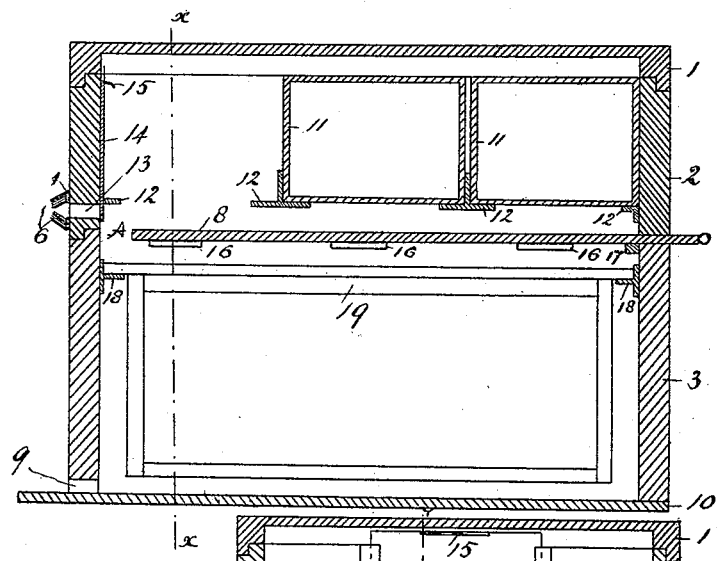
Figure 3:
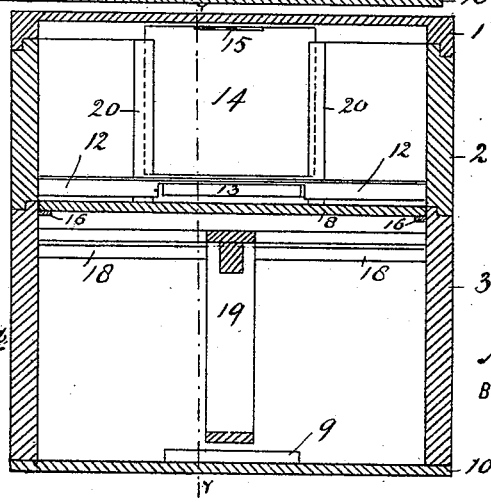

Figure 1 is a perspective view of a bee-hive provided with my improvement. Fig. 2 is a vertical section taken on the line $y\ y$, Fig. 3, looking toward the right. Fig. 3 is a vertical section taken on the line $x\ x$, Fig. 2, looking toward the left.

In the views let the reference-numeral 3 designate the main or lower portion of the bee-hive, which I will term the "breeding chamber or compartment." This chamber is provided with the bottom 10, which projects in front, as shown, forming an alighting-board for the bees. 9 is a suitable opening, through which the bees pass in and out of this chamber.

Seated above the chamber 3 and detachably secured thereto is the cap, honey-box, storage chamber or super 2. It matters not by which of these names this portion of the hive is designated, its function is the same—namely, to afford a receptacle for the surplus of spare honey or that not needed by the bees for their own subsistence.

Within compartment 3 are placed the small sections or frames 11, provided with suitable supports 12, having their extremities made fast to the sides of the compartment. There may be any number of sections 11, depending upon the size of the compartment. Only two, however, are shown in the drawings, since they are considered sufficient for the purposes of this application. These sections are removable at will, and are designed for the storage of the surplus honey, which is deposited within the comb-cells formed by the bees.

Part 2 of the hive is provided with a cover 1, suitably secured thereto and readily detachable therefrom. Parts 2 and 3 are shown in the drawings as connected by a device 7, consisting of a hook and an eye, ring, or staple. Parts 1 and 2 are secured together in a similar manner. Compartments 2 and 3 are separated from each other by the adjustable sliding board 8, which is supported upon cleats or other suitable devices 16, made fast to the sides of part 3. This board has only sufficient movement to open a space wide enough for the worker-bees to pass from the lower to the upper compartment. This space is designated A and may be closed at will by pushing the slide agaist the side of the hive. Space A affords the only direct means for the passage of the bees from one of these compartments to the other.

17 is a stop secured to the under side of board 8, its object being to limit the distance to which this board can be drawn out.

13 is a small opening or mouth leading from the inside of chamber 2 to the outer air. This opening may be partially closed on the outside by a slide 4, having an opening corresponding with aperture 13 and provided with the two bristle portions 6, extending outwardly and tapering from the base of the plate or slide nearly or quite to contact on each side of the opening, so that when the bristle-slide is in place the bees may readily pass out of the hive therethrough, but are prevented from entering through the same opening, as they cannot crawl against the tapering outwardly-projecting bristle ends.

Opening 13 may be closed on the inside by the metal slide 14, having a vertical movement and retained in position by the upright cleats or guides 20, forming ways for the edges of this slide or gate. 15 is a small flange or hook formed on the upper end of the slide, affording a means of grasping the same for purposes of adjustment.

Chamber 3 is shown provided with a suitable frame or skeleton partition 19, provided with supports 18, secured to the ends of the chamber. No further description of this part is necessary, since nothing is claimed thereon.

In the use of my improved bee-hive I will suppose that the sections 11 are full of honey, and that I wish to remove them. The adjustable board 8 is first pushed in, closing space A and preventing the entrance of any more bees from chamber 3 to compartment 2. Slide or gate 14 is then raised, opening aperture 13 and allowing the bees to pass freely out of chamber 2, but preventing their return, since the bristle-slide is in place, as heretofore described. By this means the chamber 2 is soon entirely free from bees, and the sections containing the honey may be removed at pleasure by taking off cover 1. After the honey is extracted from these sections they may be replaced within chamber 2, after which aperture 13 should be closed by depressing slide 14, and space A opened by drawing out board 8. The bees will then begin refilling sections 11.

Having thus described my invention, what I claim is—

1. In a bee-hive, the combination, with a storage-chamber suitably separated from the main hive and provided with an opening 13, of a slotted slide for guarding said opening, the slide being provided with two rows of bristles on its outer side arranged to permit egress only of the bees from the hive, substantially as described.

2. In a bee-hive, the combination, with a cap or storage-chamber 2, provided with an opening 13, of an adjustable sliding board 8, separating chamber 2 from the main hive, the slotted slide 4 for guarding opening 13 on the outside, said slide being provided with two rows of bristles arranged to permit egress only of the bees from the hive, and an adjustable slide 14, controlling aperture 13 from the inside, substantially as described.

In testimony whereof I affix my signature in presence of two witnesses.

ANDREW J. PENNOCK.

Witnesses:
   D. C. DONOVAN,
   H. M. MINOR.